(12) United States Patent
Britton et al.

(10) Patent No.: US 11,364,961 B2
(45) Date of Patent: Jun. 21, 2022

(54) SEAT BELT BUCKLE INSTALLATION JIG AND METHODS OF USE THEREOF

(71) Applicant: Toyota Motor Engineering & Manufacturing North America, Inc., Plano, TX (US)

(72) Inventors: David A. Britton, Florence, KY (US); Joanna G. Palmerton, Mt. Sterling, KY (US); John Laden, Prospect, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1 day.

(21) Appl. No.: 16/577,244

(22) Filed: Sep. 20, 2019

(65) Prior Publication Data
US 2021/0086855 A1  Mar. 25, 2021

(51) Int. Cl.
*B62D 65/14* (2006.01)
*B60R 22/18* (2006.01)
*A44B 11/25* (2006.01)

(52) U.S. Cl.
CPC .......... *B62D 65/14* (2013.01); *A44B 11/2503* (2013.01); *B60R 22/18* (2013.01)

(58) Field of Classification Search
CPC ..... B62D 65/14; A44B 11/2503; B60R 22/18; Y10T 29/49904; Y10T 29/49895; Y10T 29/49861; Y10T 29/49826
See application file for complete search history.

(56) References Cited

U.S. PATENT DOCUMENTS

| 5,197,176 A | * | 3/1993 | Reese ..................... B25B 33/00 29/270 |
| 5,496,083 A | | 3/1996 | Shouse, Jr. |
| 5,954,397 A | * | 9/1999 | Czernakowski ....... B60N 2/286 297/250.1 |
| 6,430,797 B1 | | 8/2002 | Dittmar et al. |
| 9,085,447 B1 | * | 7/2015 | Royall ....................... B25J 1/04 |
| 9,265,976 B1 | * | 2/2016 | Hensley .................. A62B 3/00 |
| 2002/0043872 A1 | * | 4/2002 | Townsend ............... B60R 22/03 297/473 |

(Continued)

OTHER PUBLICATIONS

Seat Belt Extender Pros, "Rigid Car Seat Belt Extender", Online item, Jul. 22, 2019 URL:https://www.seatbeltextenderpros.com/rigid-car-seat-belt-extender/.

*Primary Examiner* — Sarang Afzali
*Assistant Examiner* — Darrell C Ford
(74) *Attorney, Agent, or Firm* — Dinsmore & Shohl LLP

(57) ABSTRACT

A method of installing a seat belt buckle that includes inserting the seat belt buckle into a rear end of a seat belt opening, such that an engagement slot of the seat belt buckle faces a front end of the seat belt opening. The method further includes engaging the engagement slot of the seat belt buckle with a seat belt tongue of a seat belt buckle installation jig and translating the seat belt buckle from an embedded position within the seat belt opening to an extended position with the seat belt buckle installation jig, wherein the seat belt buckle is nearer to the rear end of the seat belt opening in the embedded position than in the extended position. The seat belt buckle installation jig comprises a body comprising a first distal end and a second distal end, and the seat belt tongue is coupled to the first distal end.

7 Claims, 4 Drawing Sheets

(56) References Cited

U.S. PATENT DOCUMENTS

| | | | |
|---|---|---|---|
| 2004/0140589 A1* | 7/2004 | Souther | A44B 11/2546 |
| | | | 264/328.1 |
| 2004/0207246 A1* | 10/2004 | Delventhal | A44B 11/2549 |
| | | | 297/484 |
| 2008/0115637 A1 | 5/2008 | Mayfield | |
| 2008/0290717 A1 | 11/2008 | Klapp | |
| 2008/0313871 A1* | 12/2008 | Thorbole | A44B 11/2511 |
| | | | 24/633 |
| 2010/0247230 A1* | 9/2010 | Buckingham | B60R 22/26 |
| | | | 403/16 |
| 2019/0031135 A1* | 1/2019 | Gutierrez | A44B 11/005 |

* cited by examiner

SEAT BELT BUCKLE INSTALLATION JIG AND METHODS OF USE THEREOF

TECHNICAL FIELD

The present specification generally relates to seat belt buckle installation jigs and methods of use thereof. More specifically, the specification relates to seat belt buckle installation jigs configured to improve the efficiency of installing a rear seat in a vehicle.

BACKGROUND

Rear seats are typically included in most production vehicles. Pursuant to federal, state, and local regulations, rear seats, when present, are equipped with seat belts designed to secure a passenger against harmful movement that may result during a collision or a sudden stop. Typically, the seat belts in production vehicles are three-point seat belts, which include a lap belt, a sash belt, and a tongue configured to engage with a seat belt buckle to secure the seat belt over a passenger. To install a seat belt in a rear seat of a vehicle during production, an installer must pass the seat belt buckle through a seat belt opening so that the rear seat may be properly configured to have seat belt buckle access. Currently, installers pull the seat belt buckle through the opening by hand. This manual installation arrangement may diminish productivity as the opening may be smaller than an average hand.

Accordingly, a need exists for seat belt buckle installation jigs capable of increasing the speed of seat belt installation in the rear seat of a vehicle.

SUMMARY

In one embodiment, a method of installing a seat belt buckle includes inserting the seat belt buckle into a rear end of a seat belt opening of a rear vehicle seat, such that an engagement slot of the seat belt buckle faces a front end of the seat belt opening; engaging the engagement slot of the seat belt buckle with a seat belt tongue of a seat belt buckle installation jig; and translating the seat belt buckle from an embedded position within the seat belt opening to an extended position with the seat belt buckle installation jig, wherein the seat belt buckle is nearer to the rear end of the seat belt opening in the embedded position than in the extended position. The seat belt buckle installation jig includes a body comprising a first distal end and a second distal end, and the seat belt tongue is coupled to the first distal end.

In another embodiment, a seat belt buckle installation jig includes a body comprising a first distal end having a first insertion slot and a second distal end having a second insertion slot; a first seat belt tongue extending into the first insertion slot of the first distal end of the body; and a second seat belt tongue extending into the second insertion slot of the second distal end of the body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
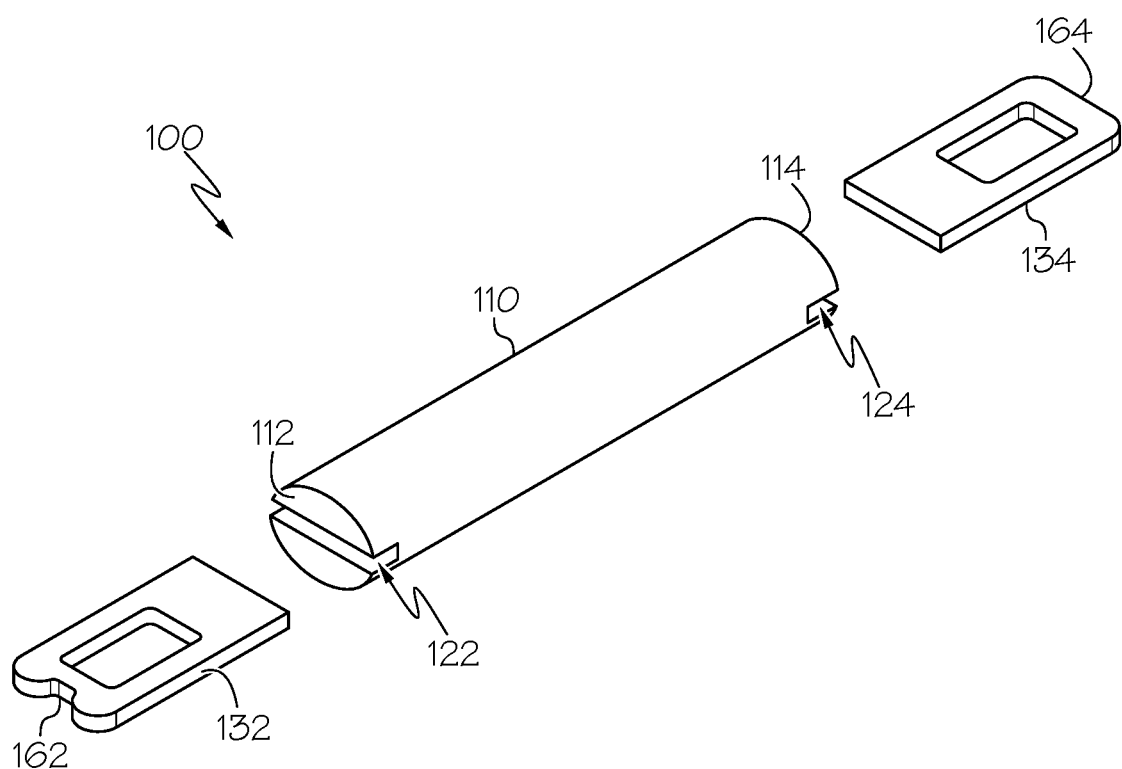
FIG. 1A depicts an exploded view of a seat belt buckle installation jig, according to one or more embodiments described herein.

Referring generally to the figures, embodiments of the present disclosure are directed to a seat belt buckle installation jig and methods of using the seat belt buckle installation jig to install a seat belt buckle into a rear seat of a vehicle. The installation jig includes a body comprising a first distal end having a first insertion slot and a second distal end having a second insertion slot. The seat belt buckle installation jig also includes a first seat belt tongue extending into the first insertion slot of the first distal end of the body and a second seat belt tongue extending into the second insertion slot of the second distal end of the body.

The seat belt buckle installation jig may be used to install seat belt buckles in a vehicle by engaging an engagement slot of a seat belt buckle that is embedded in a seat belt opening of the vehicle seat and translating the seat belt buckle from an embedded position in the seat belt opening to an extended position. Using the seat belt buckle installation jigs described herein provide for improved efficiency, for example, the time of installing a seat belt buckle may decrease by 1-3 seconds per seat belt buckle when compared to traditional installation methods completed by hand. When this process is repeatedly performed in a manufacturing setting, this time decrease greatly multiplies, thereby greatly increasing efficiency and output. Embodiments of seat belt buckle installation jigs and methods of installing a seat belt buckle with the seat belt buckle installation jigs will now be described and, whenever possible, the same reference numerals will be used throughout the drawings to refer to the same or like parts.

Figure 1B:
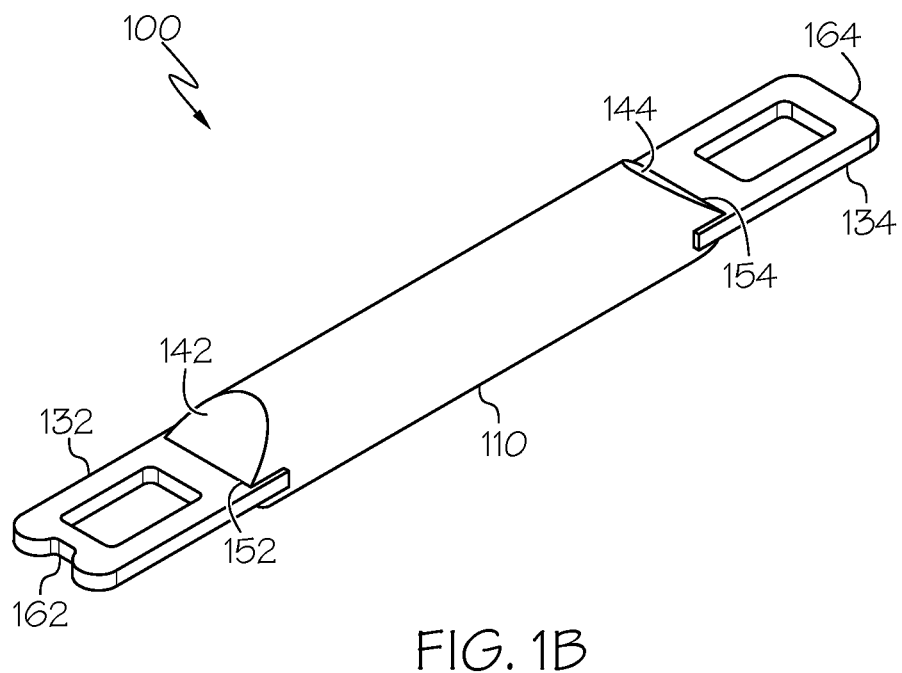
FIG. 1B depicts an isometric view of a seat belt buckle installation jig, according to one or more embodiments described herein.

Referring now to FIGS. 1A and 1B, a seat belt buckle installation jig 100 comprising a body 110 comprising a first distal end 112 having a first insertion slot 122 and a second distal end 114 having a second insertion slot 124 is depicted. As specifically depicted in FIG. 1B, the seat belt buckle installation jig 100 further comprises a first seat belt tongue 132 extending into the first insertion slot 122 of the first distal end 112 of the body 110 and a second seat belt tongue 134 extending into the second insertion slot 124 of the second distal end 114 of the body 110. While two seat belt tongues are depicted, it is contemplated, in embodiments, that the seat belt buckle installation jig 100 includes only a single seatbelt tongue. In further embodiments, the seat belt buckle installation jig 100 may include three tongues, four tongues, or any other suitable number of seat belt tongues, for example, in a spoked (e.g., a radial) arrangement.

As shown in FIG. 1B, the first distal end 112 of the body 110 may comprise a first tapered surface 142 extending from a lip 152 of the first insertion slot 122. Similarly, the second distal end 114 of the body 110 may comprise a second tapered surface 144 extending from a lip 154 of the second insertion slot 124. The first tapered surface 142 and/or the second tapered surface 144 may be formed through any suitable processes. In embodiments, the length of the first tapered surface 142 is about 10 mm. The length of the second tapered surface 144 may be identical in length and shape as the first tapered surface 142. It is believed that the inclusion of the first tapered surface 142 and/or the second tapered surface 144 allows the seat belt buckle installation jig 100 to be more easily inserted into a seat belt opening during installation. The first seat belt tongue 132 and the second seat belt tongue 134 may be affixed to the body 110 in any suitable manner, such as by welding the first seat belt tongue 132 and the second seat belt tongue 134 into the first insertion slot 122 and the second insertion slot 124, respectively.

As depicted in FIGS. 1A and 1B, the first seat belt tongue 132 may comprise a distinct shape from the second seat belt tongue 134. For example, the first seat belt tongue 132 may comprise a notched end surface 162 while the second seat belt tongue 134 comprises a flat end surface 164. It is contemplated that the distinct shapes of the first seat belt tongue 132 and the second seat belt tongue 134 correspond with distinct seat belt buckle shapes, which may vary by make or model of the vehicles into which the seat belt buckles are being installed. By including differently shaped seat belt tongues, a single seat belt buckle installation jig 100 may be used during the manufacture of different makes and models of vehicles.

The materials used to form the body 110, the first seat belt tongue 132, and the second seat belt tongue 134 are not particularly limited. In some embodiments, all of the components of the seat belt buckle installation jig 100 comprise rigid materials. Suitable rigid materials may include, but are not limited to, metals, metal alloys, purified metals, plastics, polymers, or the like. In some embodiments, the first seat belt tongue 132 and the second seat belt tongue 134 are formed from the same material, for example, a metal alloy. Regardless of which material is chosen for the first seat belt tongue 132 or the second seat belt tongue 134, the body 110 may comprise a metal bar stock. Therefore, in some embodiments, the first seat belt tongue 132 and the second seat belt tongue 134 are formed from a different material than the body 110 of the seat belt buckle installation jig 100.

Figure 2A:
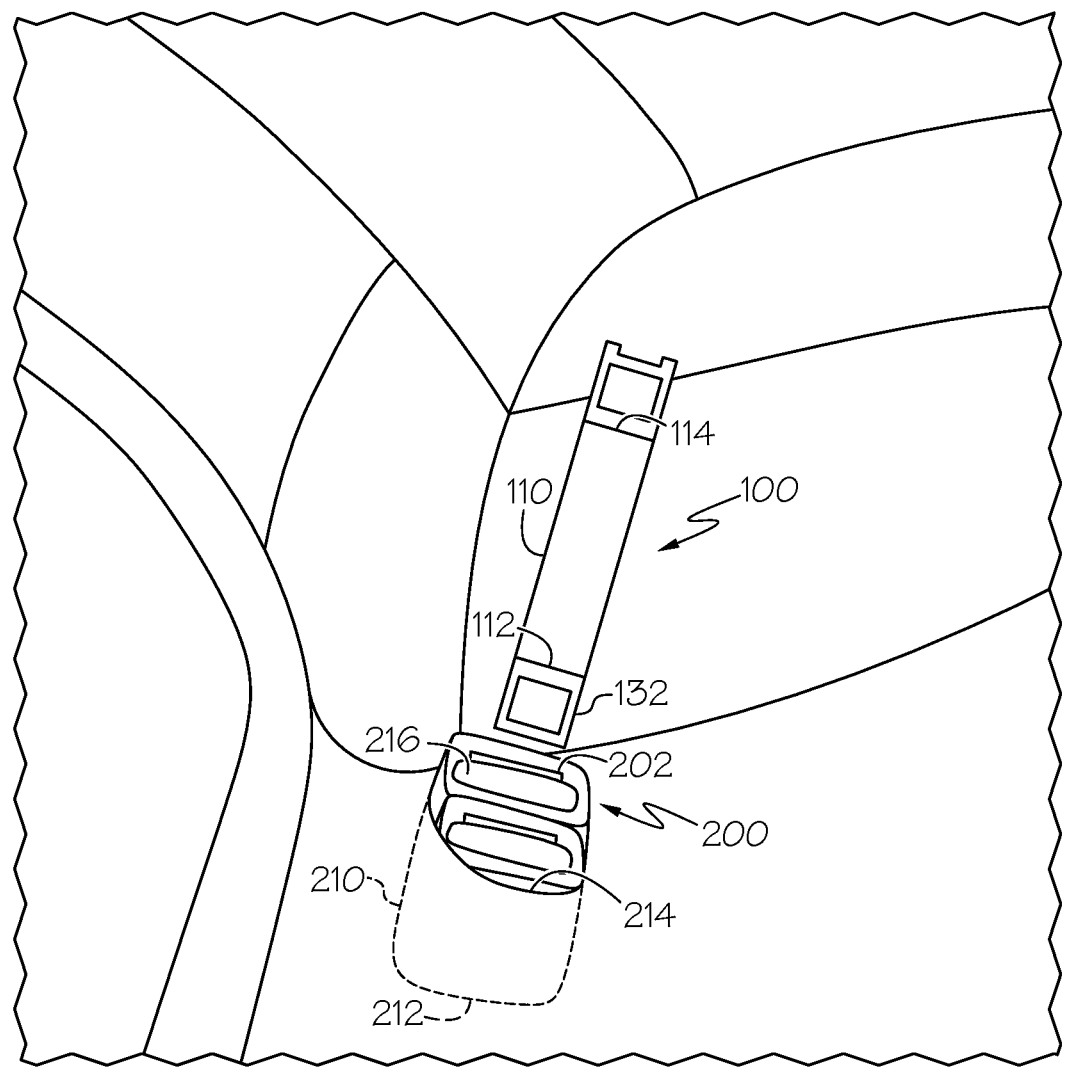
FIG. 2A depicts an embedded seat belt buckle before engagement with a seat belt buckle installation jig, according to one or more embodiments described herein.
Figure 2B:
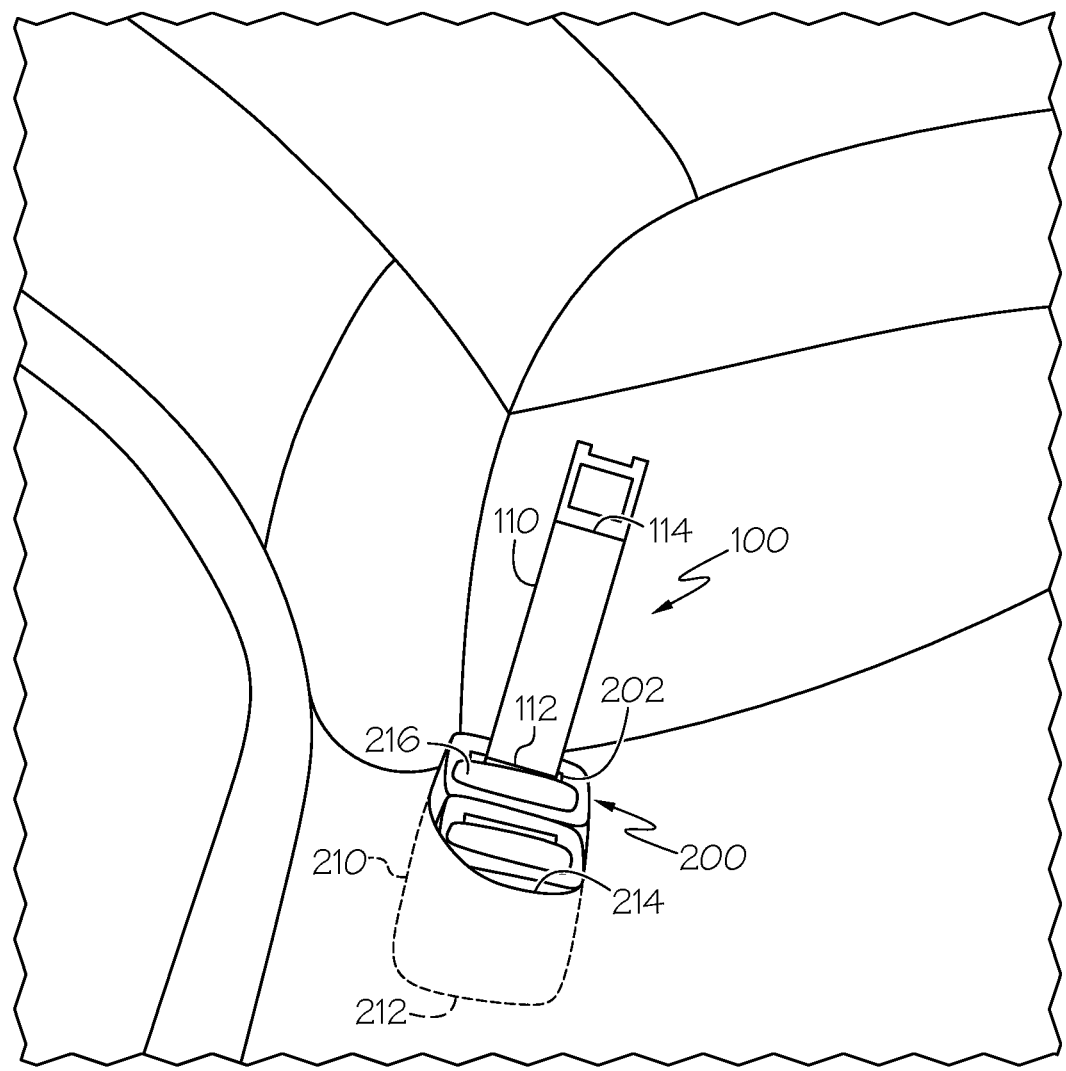
FIG. 2B depicts an embedded seat belt buckle engaged with a seat belt buckle installation jig, according to one or more embodiments described herein.
Figure 2C:
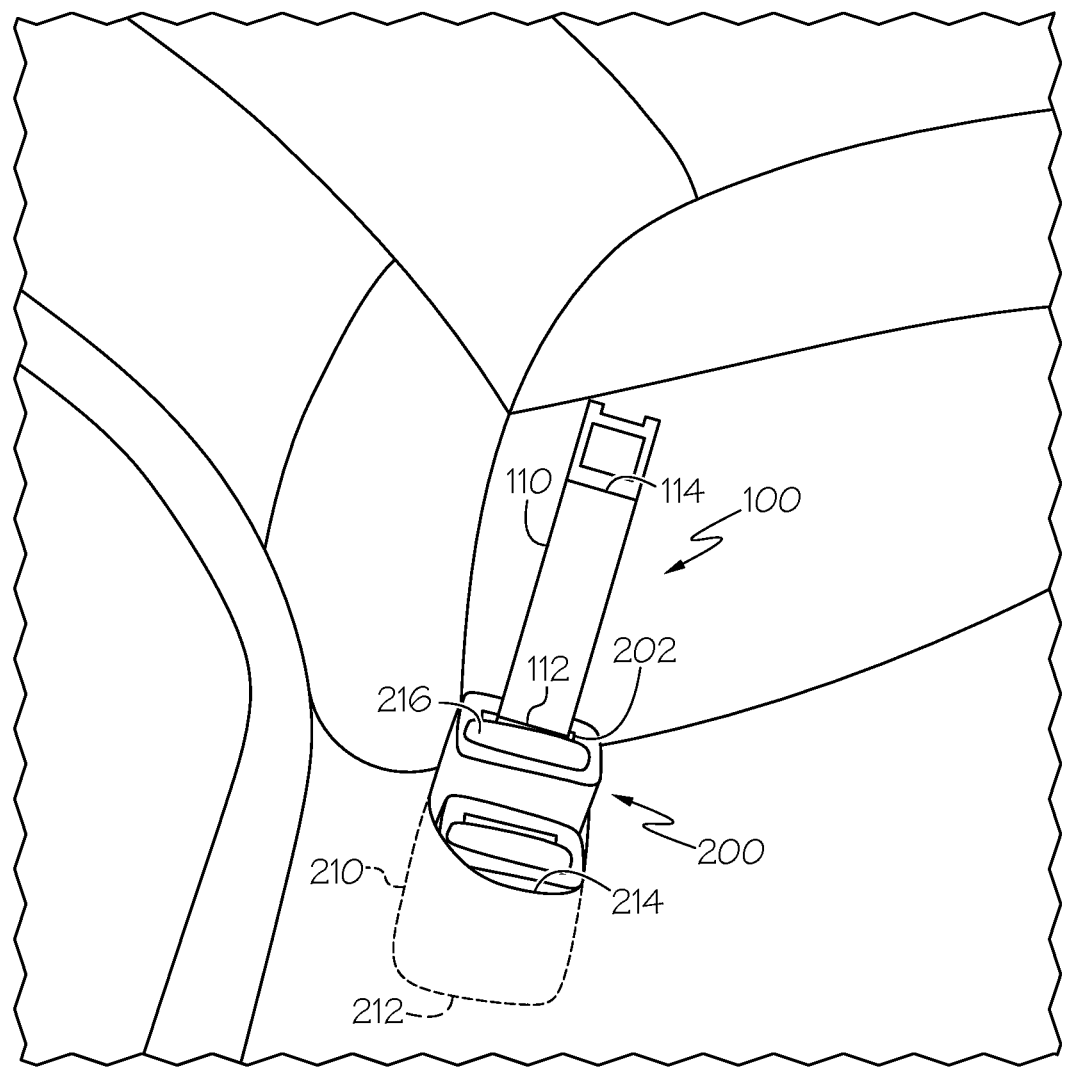
FIG. 2C depicts an extended seat belt buckle engaged with a seat belt buckle installation jig, according to one or more embodiments described herein.

The seat belt buckle installation jig 100, according to any of the previously described embodiments, may be used to install a seat belt buckle. Referring now to FIGS. 2A-2C, a method of installing a seat belt buckle 200 may include inserting the seat belt buckle 200 into a rear end 212 of a seat belt opening 210 of a rear vehicle seat, such that an engagement slot 202 of the seat belt buckle 200 faces a front end 214 of the seat belt opening 210 and the seat belt buckle 200 is in an embedded position. In the embedded position, the seat belt buckle 200 is below the front end 214 of the seat belt opening 210. The method additionally includes engaging the engagement slot 202 of the seat belt buckle 200 with a seat belt tongue 132 of a seat belt buckle installation jig, such as the previously described seat belt buckle installation jig 100.

Next, the method further includes translating the seat belt buckle 200 from an embedded position, shown in FIGS. 2A and 2B, within the seat belt opening 210 to an extended position, shown in FIG. 2C, with the seat belt buckle installation jig 100. The seat belt buckle 200 is nearer to the rear end 212 of the seat belt opening 210 in the embedded position than in the extended position. In some embodiments, when in the embedded position, the seat belt buckle 200 may be below the front end 214 of the seat belt opening 210 or flush with the front end 214 of the seat below opening 210. Further, in some embodiments, when in the extended position, the seat belt buckle 200 be flush with the front end 214 of the seat belt opening 210 or may extend outwardly from the seat belt opening 210. As the seat belt buckle 200 is nearer to the rear end 212 of the seat belt opening 210 in the embedded position than in the extended position, it should be understood that, in embodiments in which the seat belt buckle 200 is flush with the front end 214 of the seat below opening 210 in the embedded position, the seat belt buckle 200 extends extend outwardly from the seat belt opening 210 in the extended positioned. It should similarly be understood that, in embodiments in which the seat belt buckle 200 is flush with the front end 214 of the seat below opening 210 in the extended position, the seat belt buckle 200 is positioned below the front end 214 of the seat belt opening 210 in the embedded position.

Finally, the method of installing a seat belt buckle 200 may further include releasing the seat belt tongue 132 from engagement with the engagement slot 202 once the seat belt buckle 200 is in the extended position. The seat belt tongue 132 may be released from the seat belt buckle 200 by engaging with (e.g., pressing) a seat belt release 216 of the seat belt buckle 200. The method may of installing a seat belt buckle 200 may be repeatable when assembling vehicles in, for example, a manufacturing setting.

It should now be understood that embodiments described herein are directed to seat belt buckle installation jigs that include comprises a body comprising a first distal end and a second distal end, wherein the seat belt tongue is coupled to the first distal end. In particular, the belt buckle installation jigs may include a body comprising a first distal end having a first insertion slot and a second distal end having a second insertion slot; a first seat belt tongue extending into the first insertion slot of the first distal end of the body; and a second seat belt tongue extending into the second insertion slot of the second distal end of the body. The seat belt buckle installation jigs may be incorporated into methods of installing a seat belt buckle. A seat belt buckle installation jig that includes these features increases productivity by allowing an installer to more easily and quickly install a seat belt buckle in a vehicle, while maintaining the integrity of the seat into which the seat belt buckle is installed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of installing a seat belt buckle, the method comprising:
    inserting the seat belt buckle into a rear end of a seat belt opening of a rear vehicle seat, such that an engagement slot of the seat belt buckle faces a front end of the seat belt opening;
    engaging the engagement slot of the seat belt buckle with a first seat belt tongue of a seat belt buckle installation jig; and
    translating the seat belt buckle from an embedded position within the seat belt opening to an extended position with the seat belt buckle installation jig, wherein the seat belt buckle is nearer to the rear end of the seat belt opening in the embedded position than in the extended position;
    wherein the seat belt buckle installation jig comprises a body comprising a first distal end and a second distal end, the first seat belt tongue is coupled to the first distal end of the body by extending into a first insertion slot of the first distal end, and a second seat belt tongue is coupled to the second distal end of the body by extending into a second insertion slot of the second distal end of the body.

2. The method of claim 1, wherein in the extended position, the seat belt buckle is flush with the front end of the seat belt opening.

3. The method of claim 1, wherein in the extended position, the seat belt buckle extends outwardly from the seat belt opening.

4. The method of claim 1, further comprising releasing the first seat belt tongue from engagement with the engagement slot once the seat belt buckle is in the extended position.

5. The method of claim 1, wherein the first distal end of the body comprises a first tapered surface extending between a lip of the first insertion slot and a center portion of the body and the second distal end of the body comprises a tapered surface extending between a lip of the second insertion slot and the center portion of the body.

6. The method of claim 1, wherein the first seat belt tongue comprises a distinct shape from the second seat belt tongue.

7. The method of claim 6, wherein the first seat belt tongue comprises a notched end surface and the second seat belt tongue comprises a flat end surface.

* * * * *